(12) United States Patent
Rostoker et al.

(10) Patent No.: US 9,411,721 B2
(45) Date of Patent: Aug. 9, 2016

(54) DETECTING ACCESS SEQUENCES FOR DATA COMPRESSION ON NON-VOLATILE MEMORY DEVICES

(71) Applicant: SanDisk Technologies Inc., Plano, TX (US)

(72) Inventors: Tal Rostoker, Kfar Vradim (IL); Alon Marcu, Tel-Mond (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 240 days.

(21) Appl. No.: 14/081,108

(22) Filed: Nov. 15, 2013

(65) Prior Publication Data

US 2015/0143023 A1    May 21, 2015

(51) Int. Cl.
*G06F 12/00*    (2006.01)
*G06F 12/02*    (2006.01)

(52) U.S. Cl.
CPC ...... *G06F 12/0246* (2013.01); *G06F 2212/401* (2013.01); *G06F 2212/7201* (2013.01); *G06F 2212/7202* (2013.01); *G06F 2212/7205* (2013.01)

(58) Field of Classification Search
CPC ............. G06F 12/0246; G06F 2212/7201; G06F 2212/7202; G06F 2212/7205
See application file for complete search history.

(56) References Cited

U.S. PATENT DOCUMENTS

| | | |
|---|---|---|
| 5,070,032 A | 12/1991 | Yuan et al. |
| 5,095,344 A | 3/1992 | Harari |
| 5,172,338 A | 12/1992 | Mehrotra et al. |
| 5,260,555 A | 11/1993 | Sakamoto |
| 5,313,421 A | 5/1994 | Guterman et al. |
| 5,315,541 A | 5/1994 | Harari et al. |
| 5,343,063 A | 8/1994 | Yuan et al. |
| 5,418,752 A | 5/1995 | Harari et al. |
| 5,570,315 A | 10/1996 | Tanaka et al. |
| 5,595,924 A | 1/1997 | Yuan et al. |
| 5,661,053 A | 8/1997 | Yuan |

(Continued)

FOREIGN PATENT DOCUMENTS

| | | |
|---|---|---|
| JP | 1109-081332 | 3/1997 |
| JP | H09-330387 | 12/1997 |

(Continued)

OTHER PUBLICATIONS

Write Acceleration Technology for Digital Camera and CompactFlash, www.digitalfilm.com/pdf/WA_white_sheet.pdf, Sep. 30, 2003. 5 pages.

(Continued)

*Primary Examiner* — Shawn X Gu

(74) *Attorney, Agent, or Firm* — Sterne, Kessler, Goldstein & Fox P.L.L.C.

(57) ABSTRACT

Techniques are presented to allow non-volatile memory system to operate by determining ranges of logical addresses that a host typically accesses as together. For example, the system's controller can determine that the host always, or most always, writes or reads a contiguous set of logical addresses as a single unit. The controller can exploit this information by operating on these ranges as single a unit for data operations it performs. To take one example, the memory system can treat such ranges as single units for on-system data compression prior to writing the data to non-volatile memory.

25 Claims, 12 Drawing Sheets

(56) References Cited

U.S. PATENT DOCUMENTS

| | | |
|---|---|---|
| 5,694,356 A | 12/1997 | Wong et al. |
| 5,768,192 A | 6/1998 | Eitan |
| 5,784,599 A | 7/1998 | Elkhoury |
| 5,838,950 A | 11/1998 | Young et al. |
| 5,903,495 A | 5/1999 | Takeuchi et al. |
| 6,011,725 A | 1/2000 | Eitan |
| 6,040,622 A | 3/2000 | Wallace |
| 6,046,935 A | 4/2000 | Takeuchi et al. |
| 6,055,593 A | 4/2000 | Shaberman et al. |
| 6,182,162 B1 | 1/2001 | Estakhri et al. |
| 6,222,762 B1 | 4/2001 | Guterman et al. |
| 6,279,114 B1 | 8/2001 | Toombs et al. |
| 6,327,639 B1 | 12/2001 | Asnaashari |
| 6,373,746 B1 | 4/2002 | Takeuchi et al. |
| 6,381,405 B1 | 4/2002 | Yamagishi |
| 6,385,667 B1 | 5/2002 | Estakhri et al. |
| 6,408,292 B1 | 6/2002 | Bakalash |
| 6,721,854 B1 | 4/2004 | Asano et al. |
| 6,820,148 B1 | 11/2004 | Cedar et al. |
| 6,901,457 B1 | 5/2005 | Toombs et al. |
| 6,901,498 B2 | 5/2005 | Conley |
| 6,925,007 B2 | 8/2005 | Harari et al. |
| 6,941,403 B2 | 9/2005 | Cedar et al. |
| 6,971,582 B2 | 12/2005 | Kim |
| 7,107,420 B2 | 9/2006 | Boyd et al. |
| 7,427,027 B2 | 9/2008 | Elhamias et al. |
| 7,529,905 B2 | 5/2009 | Sinclair |
| 7,574,553 B2 | 8/2009 | Squires et al. |
| 7,769,945 B2 | 8/2010 | Lasser et al. |
| 7,821,864 B2 | 10/2010 | Totolos, Jr. et al. |
| 7,926,720 B2 | 4/2011 | Elhamias et al. |
| 2001/0036232 A1 | 11/2001 | Betts |
| 2002/0013881 A1 | 1/2002 | Delp et al. |
| 2002/0039325 A1 | 4/2002 | Aizawa |
| 2002/0040412 A1 | 4/2002 | Estakhri et al. |
| 2002/0112101 A1 | 8/2002 | Estakhri et al. |
| 2002/0120797 A1 | 8/2002 | Fabre |
| 2002/0169824 A1 | 11/2002 | Dettinger |
| 2002/0194552 A1 | 12/2002 | Sassa et al. |
| 2003/0028699 A1 | 2/2003 | Holtzman et al. |
| 2003/0131208 A1 | 7/2003 | Toba |
| 2005/0086553 A1 | 4/2005 | Spencer |
| 2005/0144367 A1* | 6/2005 | Sinclair ............... G06F 12/0246 711/103 |
| 2005/0185463 A1 | 8/2005 | Kanamori et al. |
| 2005/0251617 A1 | 11/2005 | Sinclair et al. |
| 2008/0043562 A1 | 2/2008 | Totolos et al. |
| 2008/0189452 A1 | 8/2008 | Merry et al. |
| 2008/0270639 A1 | 10/2008 | Elhamias et al. |
| 2010/0172180 A1 | 7/2010 | Paley et al. |
| 2010/0199109 A1 | 8/2010 | Terek et al. |
| 2010/0205462 A1 | 8/2010 | Rauschmayer et al. |
| 2010/0274962 A1 | 10/2010 | Mosek et al. |
| 2010/0306227 A1 | 12/2010 | Fleming et al. |
| 2011/0022859 A1 | 1/2011 | More et al. |
| 2011/0099405 A1 | 4/2011 | Voutilainen |
| 2011/0167186 A1 | 7/2011 | Elhamias et al. |
| 2013/0151755 A1 | 6/2013 | Elhamias et al. |

FOREIGN PATENT DOCUMENTS

| | | |
|---|---|---|
| JP | H10-170564 | 6/1998 |
| JP | 2000-181784 | 6/2000 |
| JP | 2001-297316 | 10/2001 |
| JP | 2003036202 | 2/2003 |
| JP | 2003036205 | 2/2003 |
| WO | WO 99/45460 A | 9/1999 |

OTHER PUBLICATIONS

The MultiMediaCard System Summary Based on System Specification Version 2.2, MMCA Technical Committee, Jan. 2000, pp. 2-27.

Eitan, B. et al., "NROM: A Novel Localized Trapping, 2-Bit Nonvolatile Memory Cell," *IEEE Electron Device Letters*, vol. 21, No. 11, pp. 543-545 (Nov. 2000).

* cited by examiner

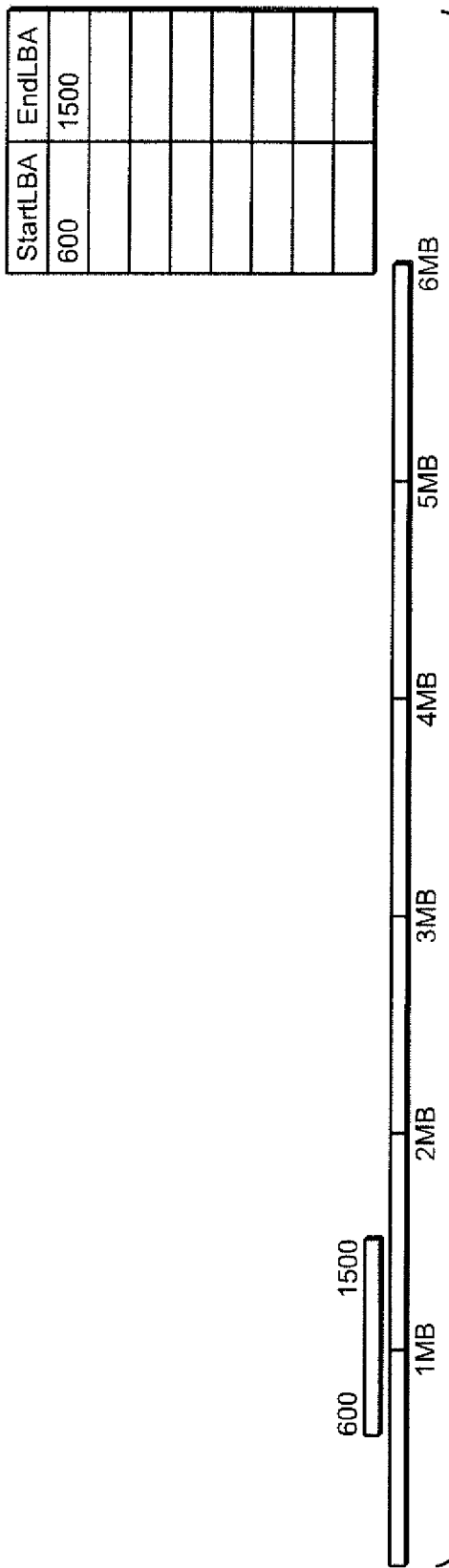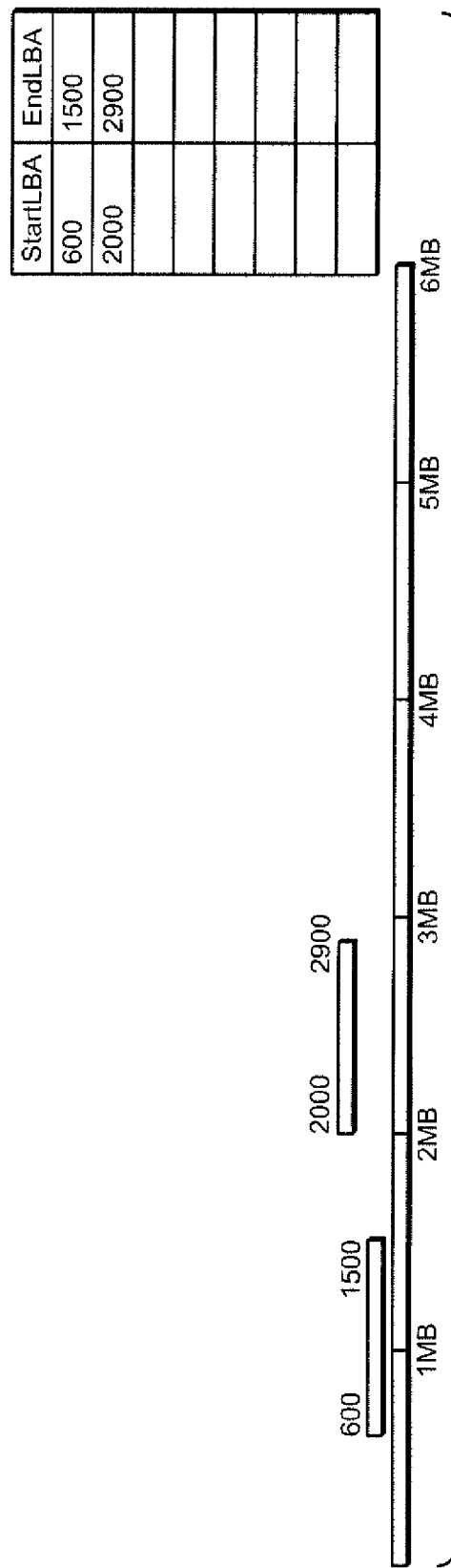
FIG. 7
FIG. 8

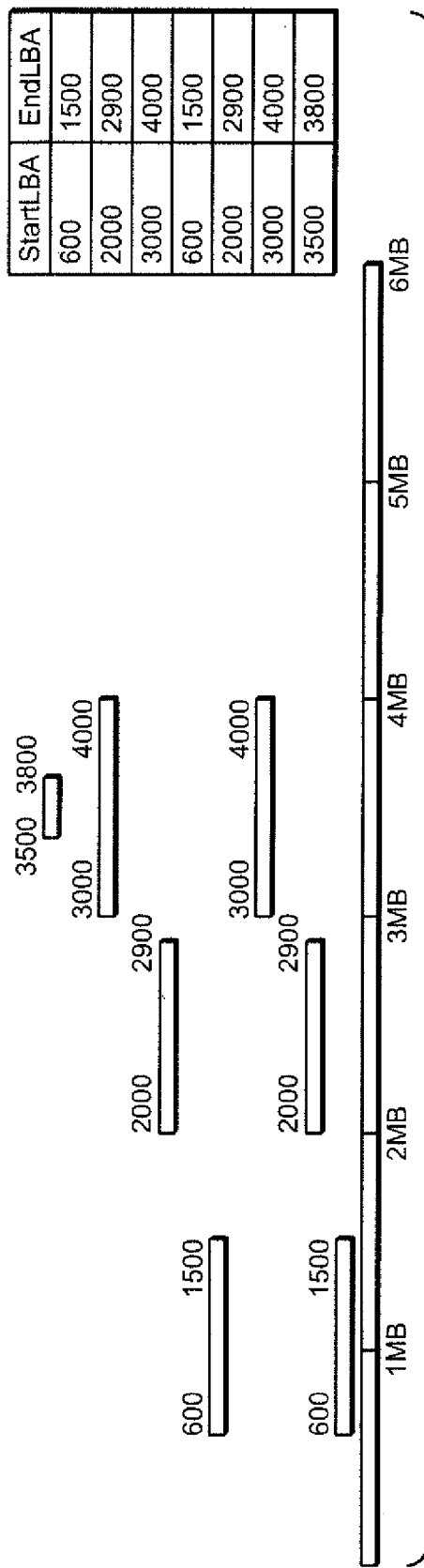

Atom Lookup Table

| Atom | StartLBA | EndLBA | Indices List |
|---|---|---|---|
| A | 600 | 1500 | 1, 6 |
| B | 2000 | 2900 | 2, 7 |
| C | 3000 | 3500 | 3, 8 |
| D | 3500 | 3800 | 4, 9, 11 |
| E | 3800 | 4000 | 5, 10 |

Atom Input Table

| Index | Atom | StartLBA | EndLBA |
|---|---|---|---|
| 1 | A | 600 | 1500 |
| 2 | B | 2000 | 2900 |
| 3 | C | 3000 | 3500 |
| 4 | D | 3500 | 3800 |
| 5 | E | 3800 | 4000 |
| 6 | A | 600 | 1500 |
| 7 | B | 2000 | 2900 |
| 8 | C | 3000 | 3500 |
| 9 | D | 3500 | 3800 |
| 10 | E | 3800 | 4000 |
| 11 | D | 3500 | 3800 |

Atom Lookup Table

| Atom | StartLBA | EndLBA | Indices List |
|------|----------|--------|--------------|
|      |          |        |              |
| AB   | NA       | NA     | 2, 7         |
| C    | 3000     | 3500   | 3, 8         |
| D    | 3500     | 3800   | 4, 9, 11     |
| E    | 3800     | 4000   | 5, 10        |

Atom Input Table

| Index | Atom | StartLBA | EndLBA |
|-------|------|----------|--------|
|       |      |          |        |
| 2     | AB   | NA       | NA     |
| 3     | C    | 3000     | 3500   |
| 4     | D    | 3500     | 3800   |
| 5     | E    | 3800     | 4000   |
|       |      |          |        |
| 7     | AB   | 2000     | 2900   |
| 8     | C    | 3000     | 3500   |
| 9     | D    | 3500     | 3800   |
| 10    | E    | 3800     | 4000   |
| 11    | D    | 3500     | 3800   |

*FIG. 17*

Atom Lookup Table

| Atom | StartLBA | EndLBA | Indices List |
|------|----------|--------|--------------|
|      |          |        |              |
| AB   | 2000     | 2900   | 2, 7         |
| C    | 3000     | 3500   | 3, 8         |
| D    | 3500     | 3800   | 4, 9, 11     |
| E    | 3800     | 4000   | 5, 10        |

Atom Input Table

| Index | Atom | StartLBA | EndLBA |
|-------|------|----------|--------|
|       |      |          |        |
| 2     | AB   | 2000     | 2900   |
| 3     | C    | 3000     | 3500   |
| 4     | D    | 3500     | 3800   |
| 5     | E    | 3800     | 4000   |
|       |      |          |        |
| 7     | AB   | 2000     | 2900   |
| 8     | C    | 3000     | 3500   |
| 9     | D    | 3500     | 3800   |
| 10    | E    | 3800     | 4000   |
| 11    | D    | 3500     | 3800   |

*FIG. 18*

Atom Lookup Table

| Atom | StartLBA | EndLBA | Indices List |
|---|---|---|---|
|  |  |  |  |
|  |  |  |  |
| ABC | NA | NA | 3, 8 |
| D | 3500 | 3800 | 4, 9, 11 |
| E | 3800 | 4000 | 5, 10 |

Atom Input Table

| Index | Atom | StartLBA | EndLBA |
|---|---|---|---|
|  |  |  |  |
|  |  |  |  |
| 3 | ABC | NA | NA |
| 4 | D | 3500 | 3800 |
| 5 | E | 3800 | 4000 |
|  |  |  |  |
|  |  |  |  |
| 8 | ABC | 3000 | 3500 |
| 9 | D | 3500 | 3800 |
| 10 | E | 3800 | 4000 |
| 11 | D | 3500 | 3800 |

*FIG. 19*

Atom Lookup Table

| Atom | StartLBA | EndLBA | Indices List |
|---|---|---|---|
|  |  |  |  |
|  |  |  |  |
| ABC | NA | NA | 3, 8 |
| D | 3500 | 3800 | 4, 9, 11 |
| E | 3800 | 4000 | 5, 10 |

Atom Input Table

| Index | Atom | StartLBA | EndLBA |
|---|---|---|---|
|  |  |  |  |
|  |  |  |  |
|  |  |  |  |
| 4 | D | 3500 | 3800 |
| 5 | E | 3800 | 4000 |
|  |  |  |  |
|  |  |  |  |
|  |  |  |  |
| 9 | D | 3500 | 3800 |
| 10 | E | 3800 | 4000 |
| 11 | D | 3500 | 3800 |

*FIG. 20*

DETECTING ACCESS SEQUENCES FOR DATA COMPRESSION ON NON-VOLATILE MEMORY DEVICES

BACKGROUND OF THE INVENTION

This application relates to the operation of re-programmable non-volatile memory systems such as semiconductor flash memory, and, more specifically, to handling and efficient storage of data on such systems.

Solid-state memory capable of nonvolatile storage of charge, particularly in the form of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retaining its stored data even after power is turned off. Also, unlike ROM (read only memory), flash memory is rewritable similar to a disk storage device. In spite of the higher cost, flash memory is increasingly being used in mass storage applications. Conventional mass storage, based on rotating magnetic medium such as hard drives and floppy disks, is unsuitable for the mobile and handheld environment. This is because disk drives tend to be bulky, are prone to mechanical failure and have high latency and high power requirements. These undesirable attributes make disk-based storage impractical in most mobile and portable applications. On the other hand, flash memory, both embedded and in the form of a removable card is ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. In particular, flash memory such as Flash EEPROM allows entire blocks of memory cells to be erased at the same time.

The floating gate can hold a range of charges and therefore can be programmed to any threshold voltage level within a threshold voltage window. The size of the threshold voltage window is delimited by the minimum and maximum threshold levels of the device, which in turn correspond to the range of the charges that can be programmed onto the floating gate. The threshold window generally depends on the memory device's characteristics, operating conditions and history. Each distinct, resolvable threshold voltage level range within the window may, in principle, be used to designate a definite memory state of the cell.

It is common in current commercial products for each storage element of a flash EEPROM array to store a single bit of data by operating in a binary mode, where two ranges of threshold levels of the storage element transistors are defined as storage levels. The threshold levels of transistors correspond to ranges of charge levels stored on their storage elements. In addition to shrinking the size of the memory arrays, the trend is to further increase the density of data storage of such memory arrays by storing more than one bit of data in each storage element transistor. This is accomplished by defining more than two threshold levels as storage states for each storage element transistor, four such states (2 bits of data per storage element) now being included in commercial products. More storage states, such as 16 states per storage element, are also being implemented. Each storage element memory transistor has a certain total range (window) of threshold voltages in which it may practically be operated, and that range is divided into the number of states defined for it plus margins between the states to allow for them to be clearly differentiated from one another. Obviously, the more bits a memory cell is configured to store, the smaller is the margin of error it has to operate in.

The transistor serving as a memory cell is typically programmed to a "programmed" state by one of two mechanisms. In "hot electron injection," a high voltage applied to the drain accelerates electrons across the substrate channel region. At the same time a high voltage applied to the control gate pulls the hot electrons through a thin gate dielectric onto the floating gate. In "tunneling injection," a high voltage is applied to the control gate relative to the substrate. In this way, electrons are pulled from the substrate to the intervening floating gate. While the term "program" has been used historically to describe writing to a memory by injecting electrons to an initially erased charge storage unit of the memory cell so as to alter the memory state, it has now been used interchangeable with more common terms such as "write" or "record."

The memory device may be erased by a number of mechanisms. For EEPROM, a memory cell is electrically erasable, by applying a high voltage to the substrate relative to the control gate so as to induce electrons in the floating gate to tunnel through a thin oxide to the substrate channel region (i.e., Fowler-Nordheim tunneling.) Typically, the EEPROM is erasable byte by byte. For flash EEPROM, the memory is electrically erasable either all at once or one or more minimum erasable blocks at a time, where a minimum erasable block may consist of one or more sectors and each sector may store 512 bytes or more of data.

The memory device typically comprises one or more memory chips that may be mounted on a card. Each memory chip comprises an array of memory cells supported by peripheral circuits such as decoders and erase, write and read circuits. The more sophisticated memory devices also come with a controller that performs intelligent and higher level memory operations and interfacing.

There are many commercially successful non-volatile solid-state memory devices being used today. These memory devices may be flash EEPROM or may employ other types of nonvolatile memory cells. Examples of flash memory and systems and methods of manufacturing them are given in U.S. Pat. Nos. 5,070,032, 5,095,344, 5,315,541, 5,343,063, and 5,661,053, 5,313,421 and 6,222,762. In particular, flash memory devices with NAND string structures are described in U.S. Pat. Nos. 5,570,315, 5,903,495, 6,046,935. Also nonvolatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

In order to improve read and program performance, multiple charge storage elements or memory transistors in an array are read or programmed in parallel. Thus, a "page" of memory elements are read or programmed together. In existing memory architectures, a row typically contains several interleaved pages or it may constitute one page. All memory elements of a page will be read or programmed together.

In the production of memory systems there is an ongoing search for solutions that will enable a memory system to store more data on less silicon. Compression of host data once it is on the memory system is one of the methods to achieve this, where the memory system can compress data in groups of sequential logical address ranges. One of the fundamental challenges of compressing data by the storage device is that it is hard to determine and characterize the groups of data that should be compressed together. The result is that a host may wish to access some data that has been compressed as part of a larger set of data, resulting in inefficiencies since the larger set of data need to be de-compressed in order to access the desired data.

SUMMARY

A general set of aspects present a method of operating a non-volatile memory system that includes a controller circuit and one or more non-volatile memory circuits. The method includes receiving at the controller circuit from a host data identified by the host by logical addresses. The controller circuit monitors access patterns by the host for host data stored on the non-volatile memory system. Based on the monitoring, the controller circuit determines contiguous ranges of logical addresses that are accessed by the host as single entities and maintains a record of the contiguous ranges of logical addresses that are accessed by the host as single entities. The controller circuit treats the contiguous ranges of logical addresses that are accessed by the host as single entities as a single unit for a data operation.

Other aspects relate to a method of operating a non-volatile memory system, where the memory system includes one or more non-volatile memory circuits and a controller circuit that manages the storage of data received from a host that are identified by logical addresses on the non-volatile memory circuits. According to the method the controller circuit maintains a record of contiguous ranges of logical addresses that are accessed by the host as single entities. In the management of host data the controller circuit treats the contiguous ranges of logical addresses that are accessed by the host as single entities as single units. The controller circuit monitors access patterns by the host for host data stored on the non-volatile memory and updating the record based on the monitoring, wherein the updating of the record includes merging of adjacent contiguous ranges of logical addresses into a single unit for the data operations by the controller circuit.

Various aspects, advantages, features and embodiments of the present invention are included in the following description of exemplary examples thereof, whose description should be taken in conjunction with the accompanying drawings. All patents, patent applications, articles, other publications, documents and things referenced herein are hereby incorporated herein by this reference in their entirety for all purposes.

To the extent of any inconsistency or conflict in the definition or use of terms between any of the incorporated publications, documents or things and the present application, those of the present application shall prevail.

BRIEF DESCRIPTION OF THE DRAWINGS

FIGS. 5-13 give an example of creating an access atom input table.

FIG. 14 illustrates a corresponding sorted input table.

FIG. 15 illustrates the splitting of access areas to atoms according to the found atom access areas.

FIGS. 16-21 show the creation of an atom lookup table and the determination of sequences of atoms.

FIG. 22 is a flow describing a general overview of the detection of access sequences for data compression or other data operation.

DETAILED DESCRIPTION

Memory System

Figure 1:
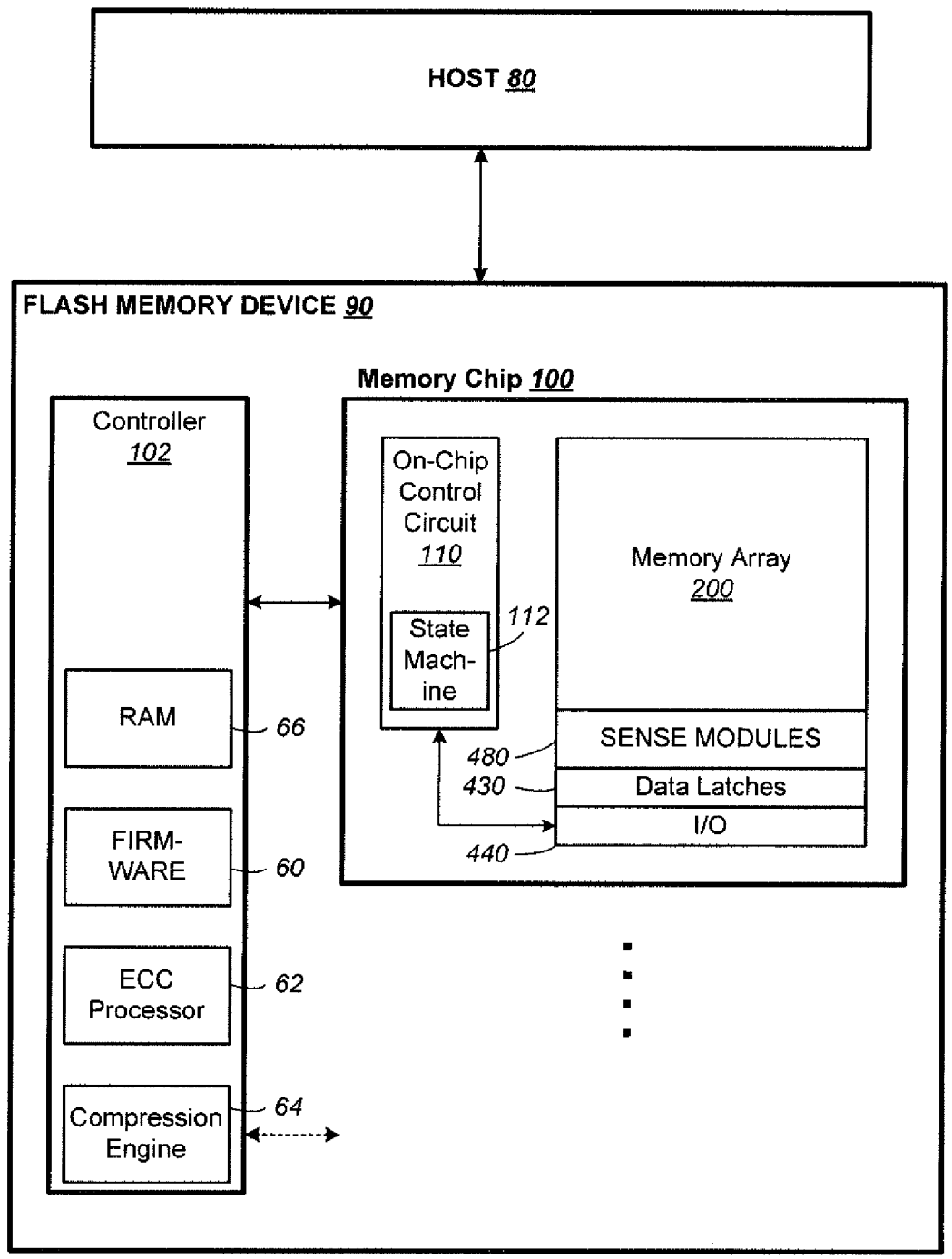
FIG. 1 illustrates a host in communication with a memory device in which the features of the present invention are embodied.

FIG. 1 illustrates a host in communication with a memory device in which the features of the present invention are embodied. The host 80 typically sends data to be stored at the memory device 90 or retrieves data by reading the memory device 90. The memory device 90 includes one or more memory chip 100 managed by a controller 102. The memory chip 100 includes a memory array 200 of memory cells with each cell capable of being configured as a multi-level cell ("MLC") for storing multiple bits of data. The memory chip also includes peripheral circuits such as sense modules 480, data latches 430 and I/O circuits 440. An on-chip control circuitry 110 controls low-level memory operations of each chip. The control circuitry 110 is an on-chip controller that cooperates with the peripheral circuits to perform memory operations on the memory array 200. The control circuitry 110 typically includes a state machine 112 to provide chip level control of memory operations.

In many implementations, the host 80 communicates and interacts with the memory chip 100 via the controller 102. The controller 102 co-operates with the memory chip and controls and manages higher level memory operations. For example, in a host write, the host 10 sends data to be written to the memory array 100 in logical sectors allocated from a file system of the host's operating system. A memory block management system implemented in the controller stages the sectors and maps and stores them to the physical structure of the memory array.

One preferred block management system is disclosed in United States Patent Publication No. US-2010-0172180-A1, the entire disclosure of which is incorporated herein by reference.

A firmware 60 provides codes to implement the functions of the controller 102. An error correction code ("ECC") processor 62 processes ECC during operations of the memory device. The controller also includes some RAM memory 66 and, as discussed below, may also include a compression/ decompression component 64. In some memory system embodiments, the controller 102 is implemented within the host.

Physical Memory Structure

Figure 2:
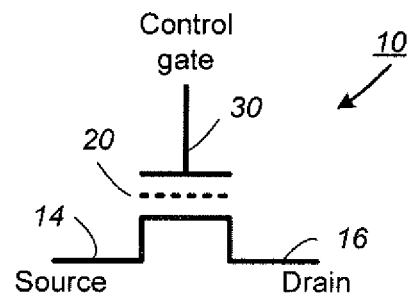
FIG. 2 illustrates schematically a non-volatile memory cell.

FIG. 2 illustrates schematically a non-volatile memory cell. The memory cell 10 can be implemented by a field-effect transistor having a charge storage unit 20, such as a floating gate or a dielectric layer. The memory cell 10 also includes a source 14, a drain 16, and a control gate 30.

There are many commercially successful non-volatile solid-state memory devices being used today. These memory devices may employ different types of memory cells, each type having one or more charge storage element. Typical non-volatile memory cells include EEPROM and flash EEPROM. Examples of EEPROM cells and methods of manufacturing them are given in U.S. Pat. No. 5,595,924. Examples of flash EEPROM cells, their uses in memory systems and methods of manufacturing them are given in U.S. Pat. Nos. 5,070,032, 5,095,344, 5,315,541, 5,343,063, 5,661,053, 5,313,421 and 6,222,762. In particular, examples of memory devices with NAND cell structures are described in U.S. Pat. Nos. 5,570,315, 5,903,495, 6,046,935. Also, examples of memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545, and in U.S. Pat. Nos. 5,768,192 and 6,011,725.

In practice, the memory state of a cell is usually read by sensing the conduction current across the source and drain electrodes of the cell when a reference voltage is applied to the control gate. Thus, for each given charge on the floating gate of a cell, a corresponding conduction current with respect to a fixed reference control gate voltage may be detected. Conversely, a threshold voltage is defined as the voltage on the control gate that will just turn on the cell with the given charge. Similarly, the range of charge programmable onto the floating gate defines a corresponding threshold voltage window or a corresponding conduction current window.

Alternatively, instead of detecting the conduction current among a partitioned current window, it is possible to set the threshold voltage for a given memory state under test at the control gate and detect if the conduction current is lower or higher than a threshold current. In one implementation the detection of the conduction current relative to a threshold current is accomplished by examining the rate the conduction current is discharging through the capacitance of the bit line or a known capacitor.

As can be seen from the description above, the more states a memory cell is made to store, the more finely divided is its threshold window. For example, a memory device may have memory cells having a threshold window that ranges from −1.5V to 5V. This provides a maximum width of 6.5V. If the memory cell is to store 16 states, each state may occupy from 200 mV to 300 mV in the threshold window. This will require higher precision in programming and reading operations in order to be able to achieve the required resolution.

The memory array 200 is typically organized as a two-dimensional array of memory cells arranged in rows and columns and addressable by word lines and bit lines. The array can be formed according to an NOR type or an NAND type architecture.

Figure 3:
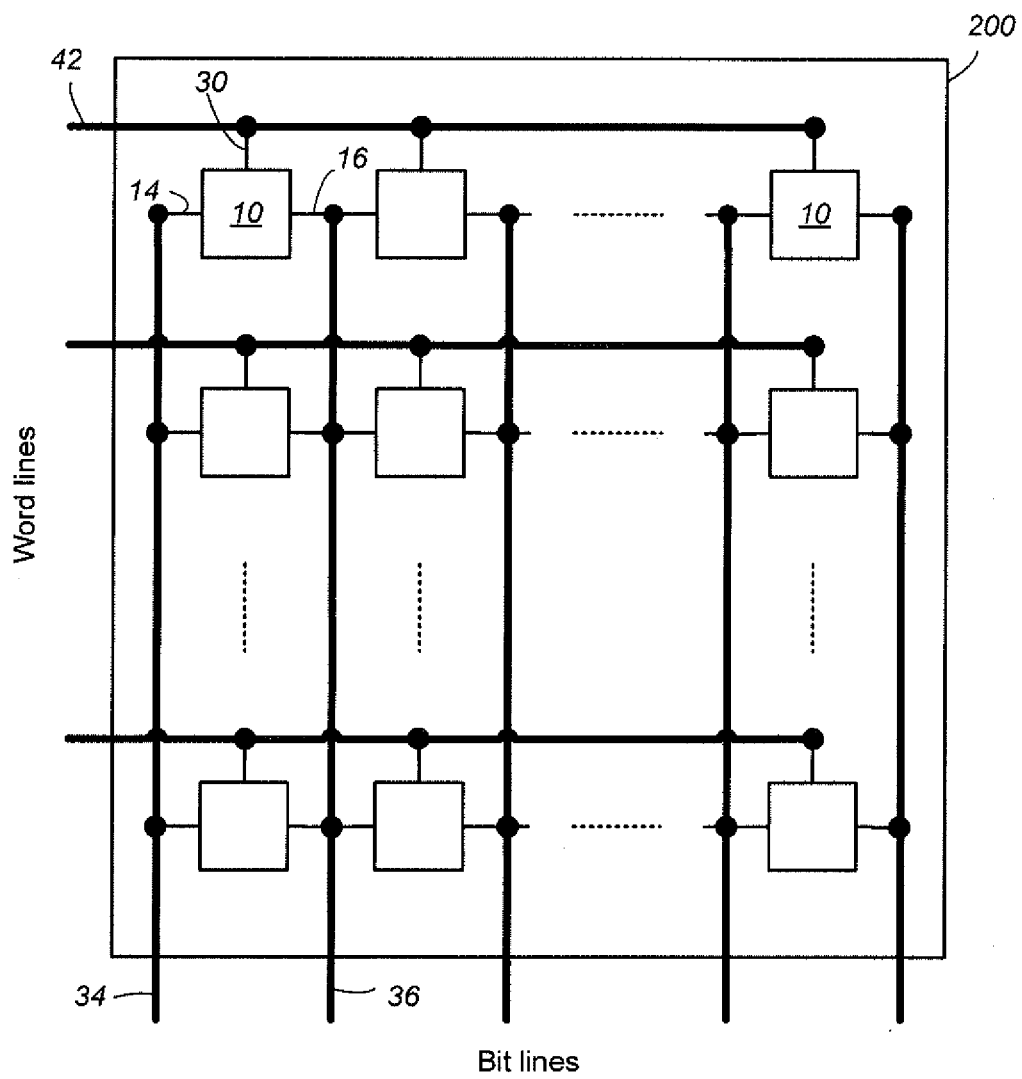
FIG. 3 illustrates an example of an NOR array of memory cells.

FIG. 3 illustrates an example of an NOR array of memory cells. In the memory array 200, each row of memory cells are connected by their sources 14 and drains 16 in a daisy-chain manner. This design is sometimes referred to as a virtual ground design. The cells 10 in a row have their control gates 30 connected to a word line, such as word line 42. The cells in a column have their sources and drains respectively connected to selected bit lines, such as bit lines 34 and 36.

Figure 4:
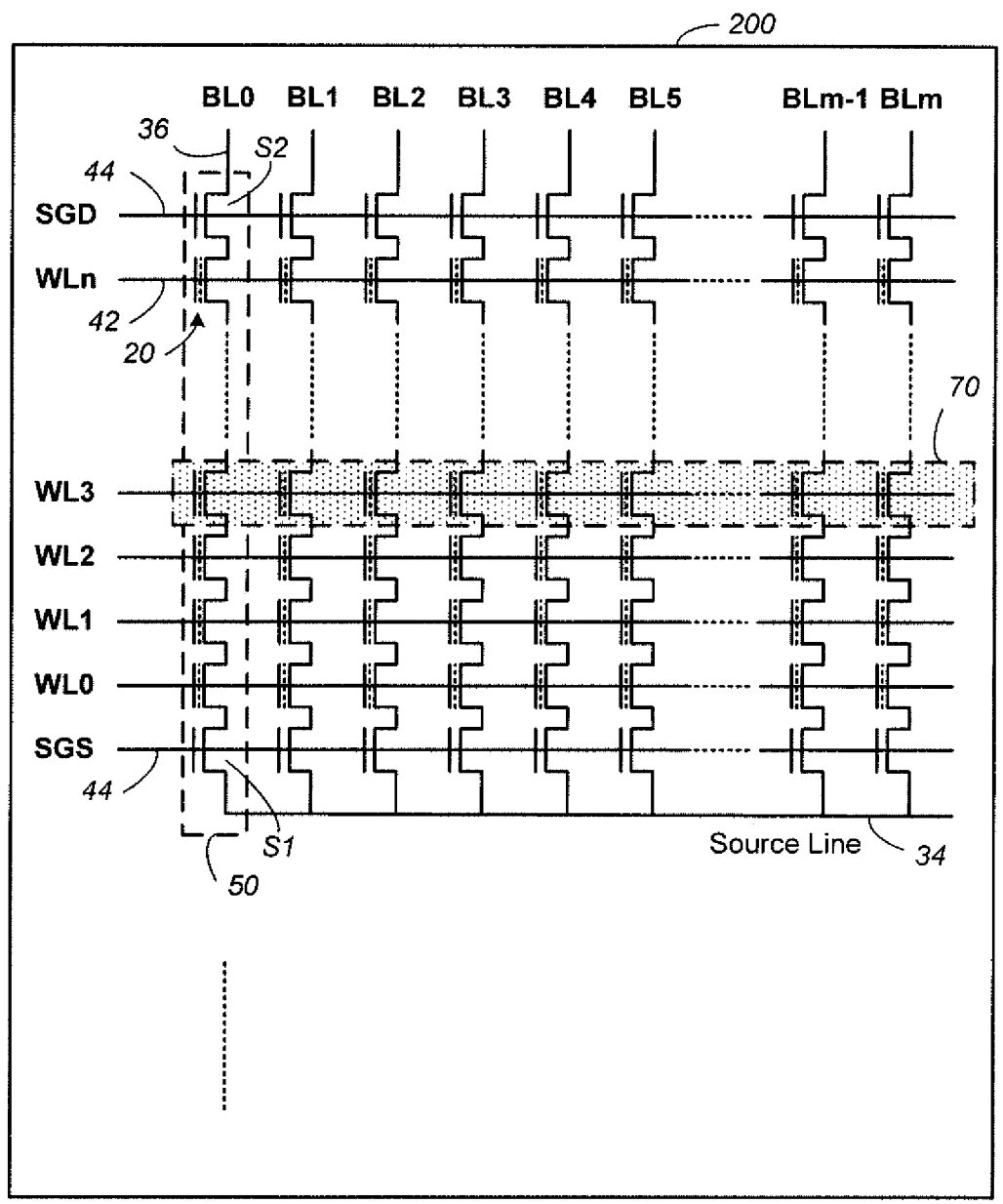
FIG. 4 illustrates a page of memory cells, organized for example in the NAND configuration, being sensed or programmed in parallel.

FIG. 4 illustrates a page of memory cells, organized for example in the NAND configuration, being sensed or programmed in parallel. FIG. 4 essentially shows a bank of NAND strings 50 in the memory array 200. A NAND string 50 comprises of a series of memory transistors (e.g., 4, 8, 16 or higher) daisy-chained by their sources and drains. A pair of select transistors S1, S2 controls the memory transistors chain's connection to the external via the NAND string's source terminal and drain terminal respectively. In a memory array, when the source select transistor S1 is turned on, the source terminal is coupled to a source line 34. Similarly, when the drain select transistor S2 is turned on, the drain terminal of the NAND string is coupled to a bit line 36 of the memory array. Each memory transistor 10 in the chain acts as a memory cell. It has a charge storage element 20 to store a given amount of charge so as to represent an intended memory state. A control gate of each memory transistor allows control over read and write operations. The control gates of corresponding memory transistors of a row of NAND string are all connected to the same word line (such as WL0, WL1, . . . ) Similarly, a control gate of each of the select transistors S1, S2 (accessed via select lines SGS and SGD respectively) provides control access to the NAND string via its source terminal and drain terminal respectively.

When an addressed memory transistor 10 within an NAND string is read or is verified during programming, its control gate is supplied with an appropriate voltage via a common word line. At the same time, the rest of the non-addressed memory transistors in the NAND string 50 are fully turned on by application of sufficient voltage on their control gates. In this way, a conductive path is effective created from the source of the individual memory transistor to the source terminal of the NAND string and likewise for the drain of the individual memory transistor to the drain terminal of the cell. Memory devices with such NAND string structures are described in U.S. Pat. Nos. 5,570,315, 5,903,495, 6,046,935.

Detecting Access Sequences for Data Compression on Non-Volatile Memory Devices

As noted in the Background section, there is an ongoing search to store data with higher density on memory devices, such as through decreasing device scales and multi-state storage. Another technique is to compress host data on the memory system prior to storage, where this is compression on the memory device itself, as opposed any compression done by the host itself prior to sending the data to the memory system. As the memory system will typically have no knowledge of the details of, or any relationships among, various set of data, under previous approaches the memory system would be left to compress data in groups of sequential logical addresses ranges per write commands. As a result, it is hard to determine and characterize the groups of data that should be compressed together and a host may want to access a set of data that the memory system compressed as part of a larger set. In order to then access the smaller data set, the larger set needs to be read, transferred to the controller and decompressed, adversely affecting performance. Consequently, the system either needs to suffer these sorts of problems or inefficiently compress data in small units. The techniques of this section address this problem by having the memory system itself detect non-sequential or sequential access sequences by the host and compressing the data accordingly. Consequently, the techniques of this section allow the memory system to adapt itself to host behaviors, where complimentary approaches and techniques are presented in U.S. Pat. No. 7,427,027 US patent application number 2013-0151755.

The exemplary embodiments of this section relate to where the controller circuit determines and maintains a record of contiguous ranges of logical addresses that are accessed by the host as single entities for purposes of on-system data compression. Although the following discussion is given primarily in terms of data compression, similar techniques can be applied to other operations on the memory system where it can be useful to identify and exploit logical addresses that the host accesses (i.e., reads, writes) as contiguous units. To take one example, the memory system can take the determined sequences of logical addresses as a group for internal memory management operations, such moving them together during internal garbage collection activities. This can help to reduce internal fragmentation and improve overall garbage collection efficiency. As another example, the memory system can manage the determined ranges as a group and keep them in the same type of physical media, such as storing them in the same format (binary or multi-state) to provide uniform performance for the whole of the group. For another example, the monitor the frequency of access to groups of data and the whole of frequently accessed groups in memory blocks having faster access times (such as binary instead of multistate or 2 bits per cell instead of a 3 bit per cell format). The knowledge that a host always, or usually, accesses a range of contiguous logical addresses as a unit can also be used to improve read performance by incorporating read ahead; that is, when the controller find that a first logical block address (LBA) of a group is accessed, the controller can predict that following LBAs from the same group will be subsequently be accessed. The techniques can also be applied to improve power failure immunity, because the memory system may chose that if it risks one LBA from the group with potential loss of data due to write of that LBA, it may as well waive loss of data in the rest of the group until all LBAs from the group are written, thereby reducing the amount of internal data backup operations due to new data coming from the host.

Although more widely application, the techniques of this section also be presented in the sort of memory system context described above, where the system includes one or more non-volatile memory chips (such as NAND type flash memory) and a controller chip that assigns host data identified by a logical addresses to physical locations on the memory chips. For example, the memory system a non-volatile memory card, solid state drive (SSD), or embedded system (such as of the "iNAND" type) for mobile phone or tablet applications. Such an arrangement can often be particularly beneficial in embedded or iNAND applications as the expected compression level in iNand is can be much higher than removable storage application, since people tend to keep in removable storage mainly media files (jpg, mp3, mp4, etc.) which are already compressed when received from the host. More generally, though, the arrangement may be used in a wide variety of applications as it is not dependent upon a particular file system structure or file knowledge.

As to the specifics of the compression, this is preferable done on the controller in a way that is as transparent to the host. The compression/decompression engine is schematically represented as a separate block 64 on the on the controller circuit 102 of FIG. 1, where the technique is not based on any specific technique. The focus here is on the compression of host data, although compression can also be applied to control information. The main focus here, though, is on the decision as to which portion of the host data to compress, and in what sequence, in order to minimize performance penalty on subsequent small read or write operations. For example, if the system compresses a large bulk of data (to gain compression efficiency due to larger dictionary size) and then subsequently needs to read only small portion of the data bulk, the system will still need to decompress the larger portion of the bulk just to get the small portion to be sent to the host, resulting in a significant reduction in performance. The techniques of this section, as illustrated by the exemplary algorithm, allows for the detection of sequences of access for host data that are always or nearly always accessed in the same manner, thus greatly reducing the probability of the described bulk unpacking situation.

More specifically, this section addresses the problem by detecting non-sequential or sequential access sequences and compressing the data accordingly. An exemplary algorithm for this can detect host access sequences that can be compressed as one unit and access (such as for host read and writes) sequences are built from access "atoms", where each atom represents a sequential logical address range that is always, or most always, accessed as a single unit by the host. Considering such an algorithm at a high level, the process can create access atoms input table to record sequential logical address ranges, such as in terms of logical block addresses (LBAs) range that are always accessed as one unit by the host, where, more generally, "always can be relaxed to almost always or typically. From this, the controller can create an atom lookup table that can store, for each atom, indices that appear in the access atoms' input table. The system can then scan the access atoms' input table and, for each atom, determine what is the next atom in the access atom input table; compare the indices of current atom to the next atom. If all indices match, the two atoms are united to a new atom (done by deleting the first atom from the atoms lookup table), with the two atoms marked the as new atom. If not all indices match, the first atom is deleted (done by deleting the first atom from the atoms lookup table). The process can them move on to the next atom in the access atom input table.

The controller circuitry can maintain the table in either volatile memory, such as RAM 66 of FIG. 1, non-volatile memory, or a combination of these. For example, a portion can be kept in RAM and a paging mechanism can be used between the RAM and the NAND memory. The exact arrangement is a design choice, since having more RAM improves performance (less paging) and reduces wear of the storage device (less writes to the non-volatile memory), but at the cost of relatively expensive extra RAM. As most of the heavy algorithmic operation can be run in the background, in many embodiments the system can manage with relatively modest amounts of RAM.

Figure 5:
Figure 6:
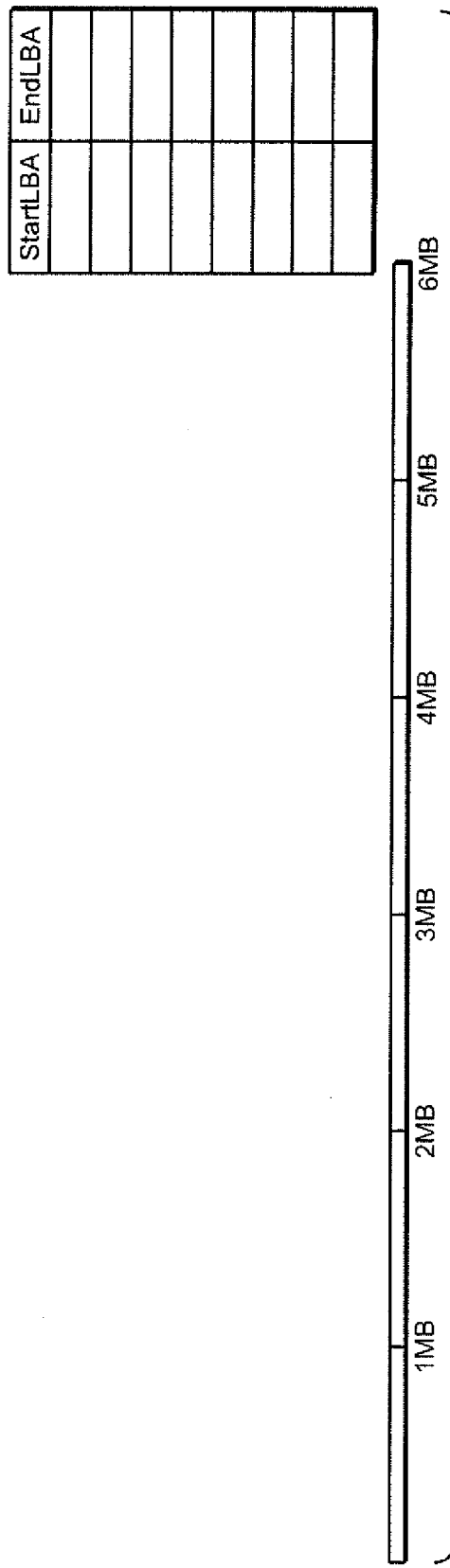
Figure 9:
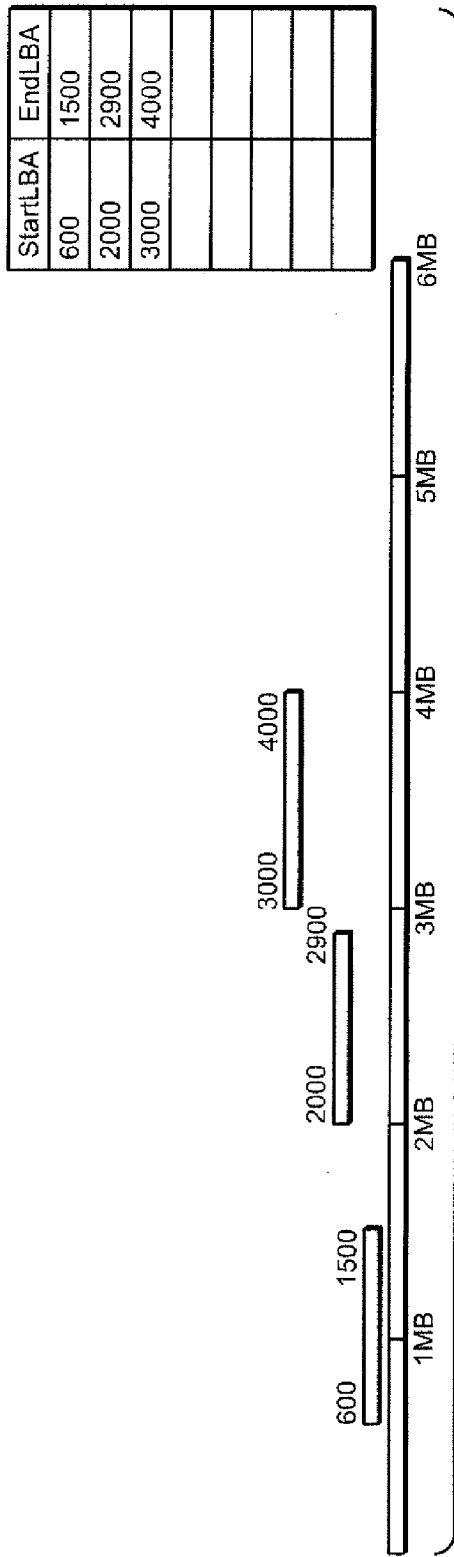
Figure 10:
Figure 11:
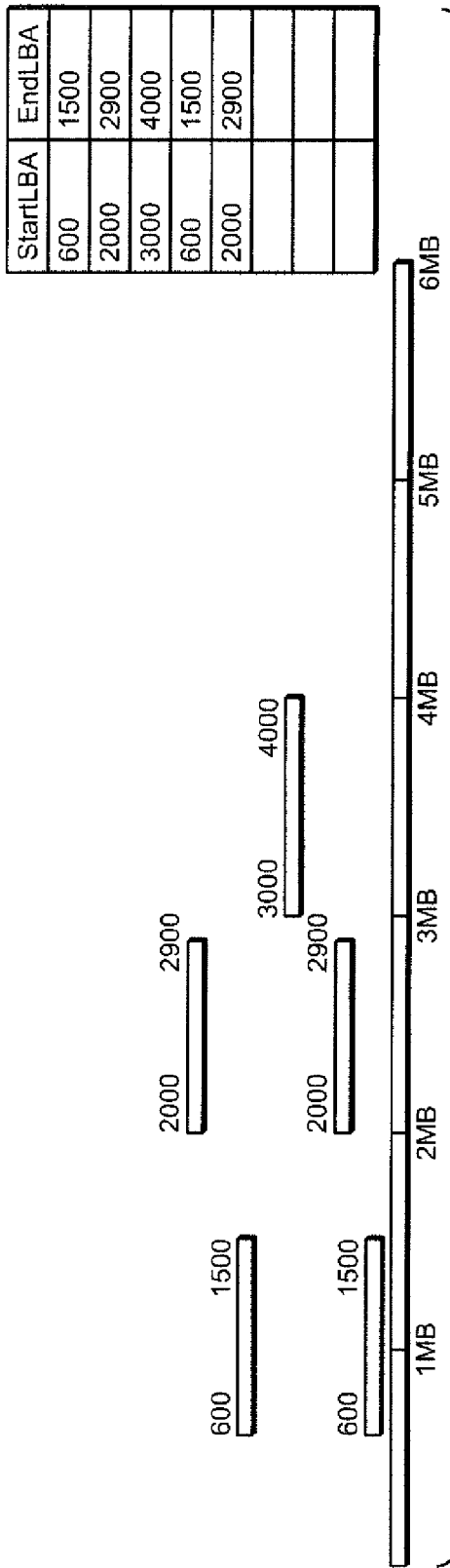
Figure 12:
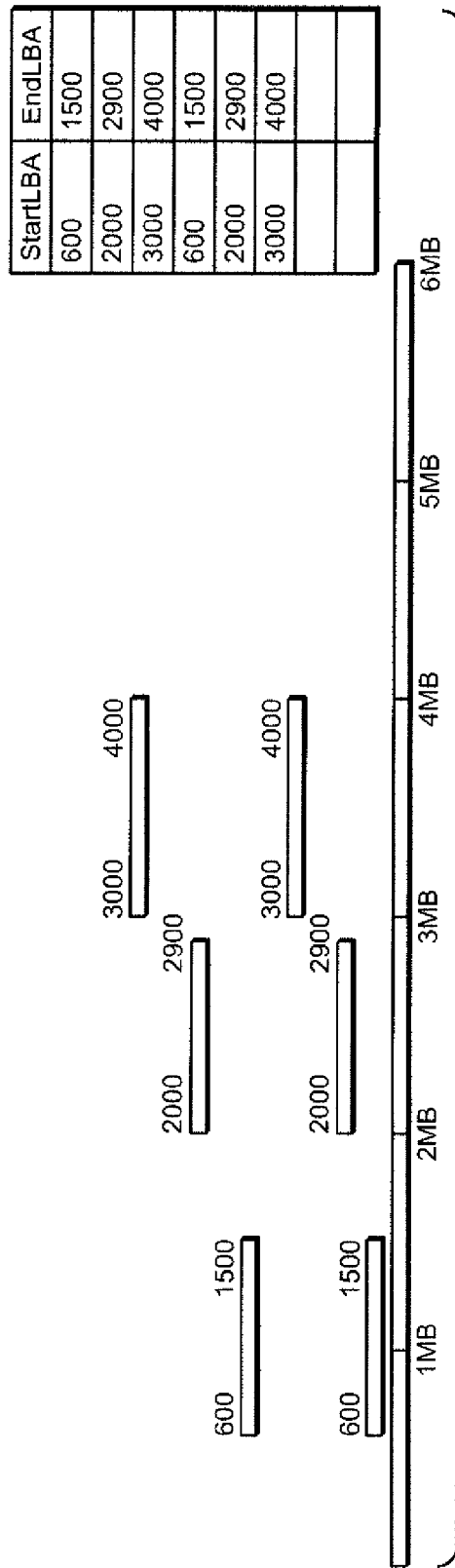

Considering an exemplary embodiment in more detail, FIG. 5 schematically illustrates a host access log that can be used to create an access atom input table for sequential LBA ranges that are accessed as one unit by the host. In FIG. 5 and similar figures, X axis is the LBA range and Y axis is the time axis. FIGS. 6-13 schematically illustrate the process, beginning with an empty access log in FIG. 6. In FIG. 7 a first host access (such as a read or a write) occurs with start LBA of 600 and end LBA of 1500, which is correspondingly recorded in the log as shown at right. The process then continues on through the examples of FIGS. 8-13.

Having built an input table, the access atoms can be determined. The exemplary embodiment does this by sorting the input table as illustrated schematically in FIG. 14. Here the logical addresses are listed in order along with whether they correspond to a starting or an ending address. Consequently, the algorithm sorts the table based on LBA order, whether the entry is a start or end logical address. The algorithm then scans the array and logs the following cases: Start followed immediately by Start, which will cause the original access to split to several atoms; Start followed immediately by End; and End followed immediately by End, which will cause the original access to split to several atoms.

Figures 15, 16:
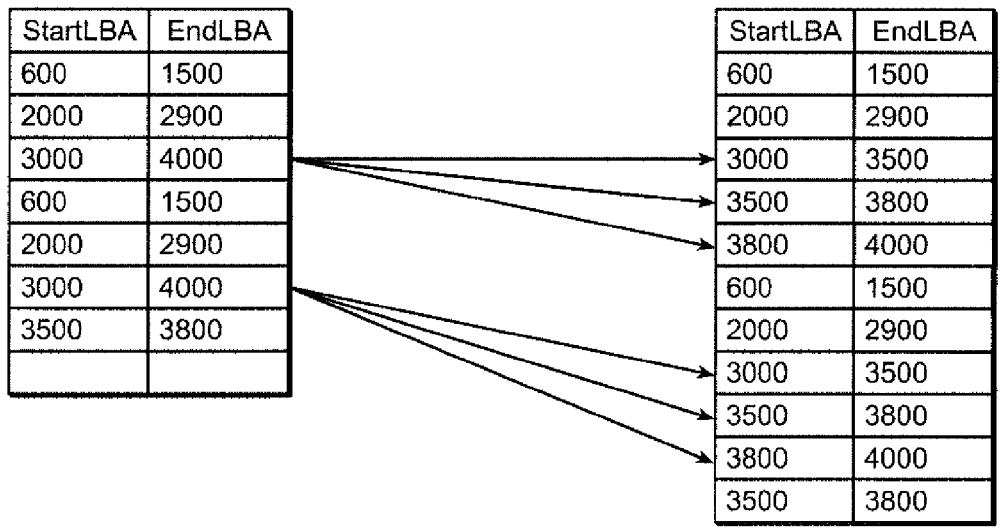

FIG. 15 illustrates the splitting of access areas to atoms according to the atom access areas found. For example, the access of LBAs 3500 to 3800 in FIG. 13 leads to the earlier access range of LBAs 3000 to 4000 to split into three. To split the atoms the algorithm has the access the LBA range 3000 to 4000. It can search for the start LBA in the input table of FIG. 14 using a binary search and after finding the start LBA it can move right in the input table split the access according to the intervals written in the table until it reaches the access end LBA.

FIG. 16 illustrates the atom lookup table at right as extracted from the atom input table at left. The different indices with the same start and end LBAs at right are combined into the different atoms (A, B, . . . ) at left, where the lookup table also shows the corresponding indices for each atom.

The process of looking for sequences of atoms starts from atom A (the first atom in the array), where the next atom is B. The controller check to see that atom A is always followed by atom B and that atom B does not follow any atoms other than A. If this is true than A and B are a sequence. Continuing to FIG. 17, the controller can erase atom A from the lookup table and the input table. Atom B is then replaced with new atom AB in the tables.

Starting from the new atom AB, the next atom on FIG. 18 is C. After checking to see that atom AB is always followed by atom C and atom C does not follow any atom other than AB, the controller can tell that AB and C are a sequence. Atom AB is then erased from the lookup table and the input table, with atom C replaced with new atom ABC as shown in FIG. 19. AB is then a compression candidate.

Figures 21, 22:
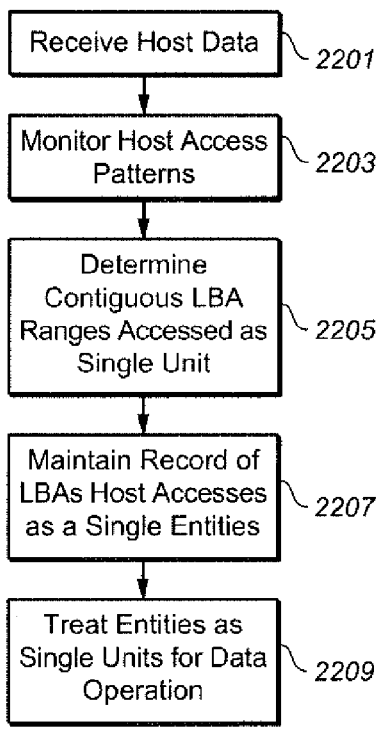

Starting from the new atom ABC in FIG. 20, the next atom is D. The algorithm then checks on whether atom ABC is always followed by atom D and atom D doesn't follow any other atom than ABC. In this case, however, this is not true as D also follows E. Atom ABC is erased from the input table. ABC is a compression candidate now. Atom D is erased from the input table (FIG. 21). The algorithm is finished with the following areas for compression: ABC, D, E.

FIG. 22 gives a general overview of the process. The memory system receives data from a host at 2201. The host identifies the host data by logical addresses, for which the controller would assign physical addresses by the controller for the purposes of writing data into the non-volatile memory. (In the process the data may go on to be written into the memory chips or just be cached.) At 2203, the controller monitors the patterns by which the host accesses, such as during read and write operations, the host data stored on the memory system. It should be noted that although FIG. 22 represents the process in a sequential manner, it will be appreciated that during actually operation of the memory system these will overlapping interrelated operations; for example, the host can continue access operations as these are monitored and so on. Based on the monitoring, the controller determines contiguous ranges of logical addresses that are accessed by the host as single entities at 2205. The controller maintains a record (2207) of the contiguous ranges of logical addresses that are accessed by the host as single entities. The controller can then treat (2209) these contiguous ranges of logical addresses that are accessed by the host as single entities as a single unit for a data operation, such as for compression.

Adjustment parameters can be used in algorithm. For example, these could include a MAX_LBA_RANGE_FOR_COMPRESSION parameter that defines the maximum size for compression and when adding an atom to a sequence the controller would check to see that the size does not exceed this maximum allowed value. Another adjustable parameter can be MAX_LBA_RANGE_TO_SKIP, which can define the maximum size that the algorithm can skip while searching for new a compression sequence. This value can be configured according to the read cache size, enabling the system to store the skipped range. These parameters could be held in a register on the controller circuit, for example.

The exemplary embodiment described above can be extended in a number of ways. For example, the algorithm can be enabled to detect an access sequence that is not made up of fully consecutive atoms (using the MAX_LBA_RANGE_TO_SKIP parameter described in in the previous paragraph). For example, for an access pattern of ABC, ABDC, ABEC, the algorithm can skip an atom to define access sequence=>ABC (insertion). In another case, for the access patterns found of AB, ABDC, ABEC, the algorithm can add an atom to define access sequence (deletion)=>ABC. The access sequence ABCD, ABCDE, ACDE, ABDE (insertion+deletion) can have several options, where the longest is ABCDE. Any of these can further optimize on-memory compression of host data.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

The invention claimed is:

1. A method of operating a non-volatile memory system including a controller circuit and one or more non-volatile memory circuits, the method comprising:
   receiving, at the controller circuit, logically-addressed host data from a host;
   storing the host data in the one or more non-volatile memory circuits;
   monitoring, by the controller circuit, access patterns by the host of the host data stored in the one or more non-volatile memory circuits;
   determining, by the controller circuit, ranges of contiguous logical addresses of the host data that are accessed by the host as single entities in response to the monitoring;
   maintaining, by the controller circuit, a record of the ranges of contiguous logical addresses of the host data that are accessed by the host as single entities;
   merging, by the controller circuit, at least two of the ranges of contiguous logical addresses of the host data that are in the record into a single logical unit;
   updating, by the controller circuit, the record to include the single logical unit; and
   performing, by the controller circuit, a data operation on the single logical unit.

2. The method of claim 1, further comprising:
   splitting one of the ranges of contiguous logical addresses that is in the record into separate logical units for the data operation; and
   updating the record in response to the splitting.

3. The method of claim 1, further comprising:
adding another range of contiguous logical addresses to the record.

4. The method of claim 1, further comprising:
deleting one of the ranges of contiguous logical addresses from the record.

5. The method of claim 1, wherein the data operation includes compressing the host data corresponding to the single logical unit and storing the compressed host data in the one or more non-volatile memory circuits.

6. The method of claim 1, wherein the data operation includes performing internal garbage collection operations on the host data corresponding to the single logical unit.

7. The method of claim 1, wherein the data operation includes performing write operations on the host data corresponding to the single logical unit.

8. The method of claim 1, wherein the data operation includes performing a read operation on the host data corresponding to the single logical unit, wherein the read operation incorporates a predictive read.

9. The method of claim 1, wherein the data operation includes performing internal data backup operations on the host data corresponding to the single logical unit.

10. The method of claim 1, wherein the access patterns include read operations.

11. The method of claim 1, wherein the access patterns include write operations.

12. The method of claim 1, wherein the merging comprises:
determining, by the controller circuit, that the host consistently accesses a first range of the at least two ranges before the host accesses a second range of the at least two ranges.

13. A method of operating a non-volatile memory system, the memory system including one or more non-volatile memory circuits and a controller circuit that manages storage of logically-addressed host data received from a host in the one or more non-volatile memory circuits, the method comprising:
maintaining, by the controller circuit, a record of ranges of contiguous logical addresses that are accessed by the host as single entities;
treating, by the controller circuit, the ranges of contiguous logical addresses that are accessed by the host as single entities as single units for data operations; and
monitoring, by the controller circuit, access patterns by the host of the host data stored in the one or more non-volatile memory circuits and updating the record based on the monitoring, wherein the updating includes merging at least two of the ranges of contiguous logical addresses into a single logical unit; and
compressing the single logical unit.

14. The method of claim 13, wherein the monitoring and updating include:
creating an access table of the ranges of contiguous logical addresses;
creating a lookup table from the access table; and
determining the single units for data operations from the lookup table.

15. The method of claim 14, wherein the creating of the access table includes:
sequentially sorting start and end logical addresses of the ranges of contiguous logical addresses.

16. The method of claim 14, wherein the determining the single units for data operations from the lookup table includes:
determining whether each of the ranges of contiguous logical addresses accessed by the controller circuit is consistently followed by another of the ranges of contiguous logical addresses accessed by the controller circuit in the lookup table.

17. The method of claim 13, wherein the updating of the record further includes splitting of a range of contiguous logical addresses into separate units for the data operations by the controller circuit.

18. The method of claim 13, wherein the updating of the record further includes adding a range of contiguous logical addresses to the record.

19. The method of claim 13, wherein the updating of the record further includes deleting a range of contiguous logical addresses from the record.

20. A non-volatile memory device comprising:
a non-volatile memory circuit; and
a controller circuit configured to
receive logically-addressed host data from a host;
store the host data in the non-volatile memory circuit;
monitor access patterns by the host of the host data stored in the non-volatile memory circuit;
determine ranges of contiguous logical addresses of the host data that are accessed by the host as single entities in response to the monitoring;
maintain a record of the ranges of contiguous logical addresses of the host data that are accessed by the host as single entities;
merge at least two of the ranges of contiguous logical addresses of the host data that are in the record into a single logical unit;
update the record to include the single logical unit; and
perform a data operation on the single logical unit.

21. The device of claim 20, wherein, during the merge, the controller circuit is further configured to determine that the host consistently accesses a first range of the at least two ranges before the host accesses a second range of the at least two ranges.

22. The device of claim 20, wherein the controller circuit is further configured to split one of the ranges of contiguous logical addresses that is in the record into separate logical units for the data operation, and update the record in response to the split.

23. The device of claim 20, wherein the data operation includes compressing the host data corresponding to the single logical unit and storing the compressed host data in the non-volatile memory circuit.

24. The device of claim 20, wherein the data operation includes performing internal garbage collection operations on the host data corresponding to the single logical unit.

25. The device of claim 20, wherein the access patterns include read operations or write operations.

* * * * *